United States Patent [19]

Lu et al.

[11] Patent Number: 4,787,713

[45] Date of Patent: Nov. 29, 1988

[54] TRANSPARENT LASER-ADDRESSED LIQUID CRYSTAL LIGHT MODULATOR CELL

[75] Inventors: Sun Lu, San Jose; Aharon Hochbaum, Berkeley, both of Calif.

[73] Assignee: The Mead Corporation, Dayton, Ohio

[21] Appl. No.: 53,216

[22] Filed: May 22, 1987

[51] Int. Cl.⁴ .................................................. G02F 1/13
[52] U.S. Cl. ................................ 350/342; 350/350 S; 350/338
[58] Field of Search ................... 350/350 S, 351, 342, 350/336, 338; 250/331

[56] References Cited

U.S. PATENT DOCUMENTS

| | | | |
|---|---|---|---|
| 3,824,002 | 7/1974 | Beard | 250/331 |
| 3,910,681 | 10/1975 | Elliott et al. | 350/338 |
| 3,999,838 | 12/1976 | Sprokel | 350/351 |
| 4,012,119 | 3/1977 | Adams et al. | 350/338 |
| 4,114,991 | 9/1978 | Bleha, Jr. et al. | 350/342 |
| 4,185,894 | 1/1980 | Hilton et al. | 350/336 |
| 4,470,669 | 9/1984 | Kubota et al. | 350/350 S |
| 4,564,853 | 1/1986 | Egan | 346/108 |
| 4,585,310 | 4/1986 | Clecak et al. | 350/350 S |
| 4,595,260 | 6/1986 | Kubota | 350/351 |
| 4,679,910 | 7/1987 | Efron et al. | 350/342 |

OTHER PUBLICATIONS

A. Bell—"Antireflection Structures for Optical Recording" IEEE Journal of Quantum Electronics, vol. 14, No. 7, Jul. 1978—pp. 487-495.

R. Kingslake—"Applied Optics and Optical Engineering" Academic Press—New York, London, 1965—vol. 1—pp. 285-323.

A. G. Dewey—"Laser Addressed Liquid Crystal Displays" Optical Engineering—vol. 23—No. 3—May/June 1984—pp. 230-240.

I. F. Chang—"Low Power Laser—Addressed L C Projection Display Device" IBM Technical Disclosure Bulletin—vol. 24—No. 3—Aug. 1981.

Primary Examiner—Stanley D. Miller
Assistant Examiner—Tai V. Duong
Attorney, Agent, or Firm—Biebel, French & Nauman

[57] ABSTRACT

A laser-addressable liquid crystal cell includes first and second transparent substrate layers forming the outer surfaces for the cell. First and second electrode layers are each formed from a transparent electrically conductive material, with the first and second electrode layers adjacent the first and second substrate layers, respectively. A smectic liquid crystal layer is disposed between the electrode layers. A three layer structure is disposed between the liquid crystal layer and the second electrode layer for absorbing infrared radiation while permitting visible radiation to pass therethrough. This structure includes a layer of radiation absorbing material, a layer selectively reflective to infrared radiation and transparent to visible radiation, and a spacer layer of dielectric material disposed therebetween.

26 Claims, 1 Drawing Sheet

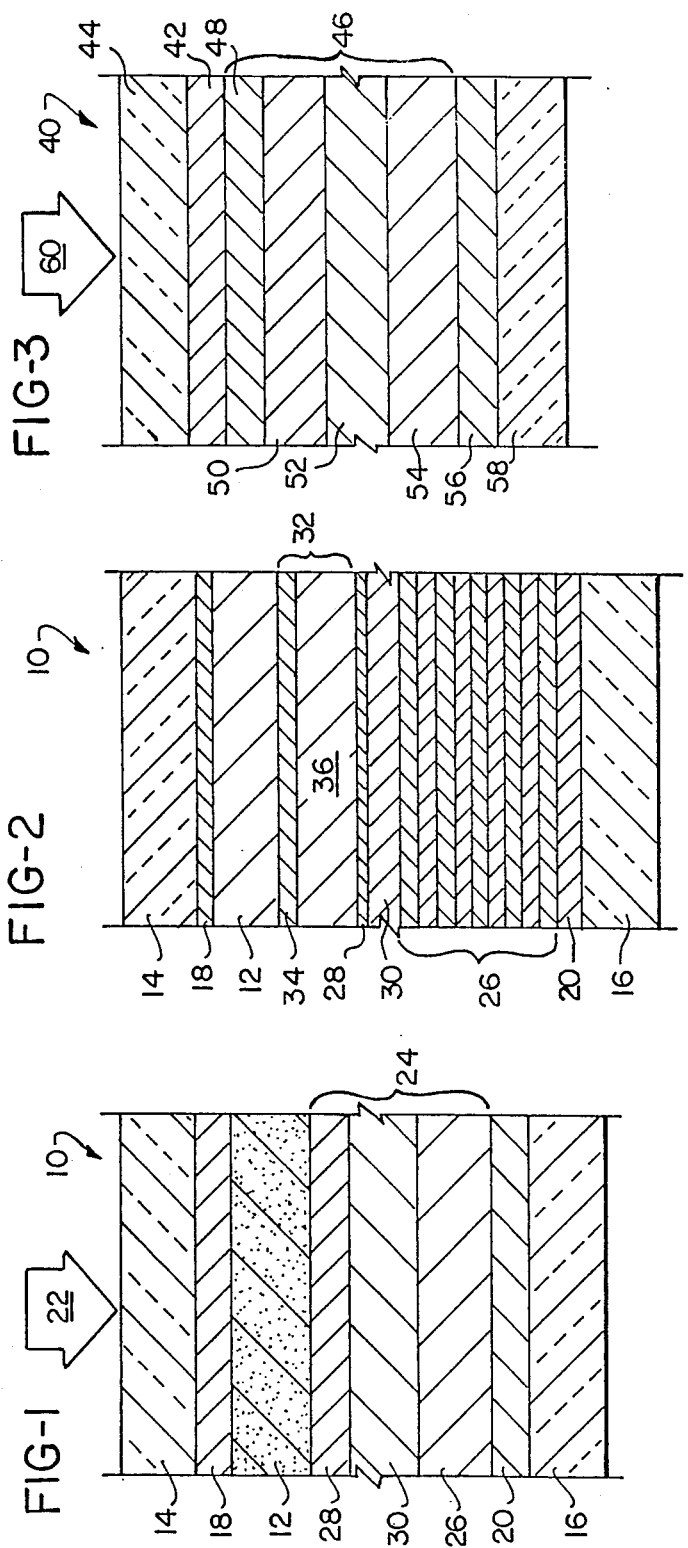

TRANSPARENT LASER-ADDRESSED LIQUID CRYSTAL LIGHT MODULATOR CELL

BACKGROUND OF THE INVENTION

The present invention relates generally to liquid crystal devices used as light modulators for the projection of images. More particularly, the invention relates to a liquid crystal cell upon which information can be written by a laser beam for subsequent projection. The cell operates in a transmissive mode, whereby projection can be performed directly through the cell.

Devices employing liquid crystal materials have received considerable attention over the past several decades. The majority of these liquid crystal devices utilize liquid crystals of the nematic class. Such devices are incapable of data storage and must be continually addressed or refreshed. However, this is not a disadvantage where the desired display is dynamic and subject to substantially continuous updating.

A second class of liquid crystal materials, known as smectic liquid crystals, possess a storage capability in that image information need be written onto the liquid crystal cell only once. The written information is thereafter essentially permanent until erased.

Laser-addressed liquid crystal light modulators have been developed utilizing these smectic materials as high resolution projection display devices. The writing mechanism on these devices is primarily thermal. A focused infrared laser beam is used to heat the smectic liquid crystal material into the isotropic state. Afterwards, the liquid crystal is cooled back to smectic state and forms a light-scattering region. The written scattering region is stable within the smectic temperature range of the specific liquid crystal material, and the written information will be preserved. The cell can be erased by an electric field of the order of 105 volts cm or by a combined effect of heating and an applied electric field.

By projecting visible light through the cell following writing of the cell, any image written can then be projected onto a display screen, a photosensitive material, or the like. A variety of such display devices are discussed in Dewey, "Laser-Addressed Liquid Crystal Displays," *Optical Engineering* 23(3), 230–240 (May/June 1984).

Two types of laser-addressed liquid crystal light modulator devices have been developed for use in conjunction with an infrared diode laser. Both are discussed in the referenced publication of Dewey. One such device, known as a reflective device, utilizes a thin film infrared absorber fabricated on one of the substrates of the liquid crystal cell. As the infrared beam is scanned across the absorber layer, the radiation is converted to heat to produce scattering regions within the cell. However, the thin film infrared absorber is opaque, not only to infrared radiation but also to the visible radiation used in projecting the finished image. Thus, the image written on the liquid crystal cell must be projected by reflecting the visible radiation off the cell. This in turn necessitates the use of a relatively complex reflective optical system.

A second type of device is commonly known as a transmissive device. Typically, an infrared absorption dye having its peak absorption at the laser wavelength is doped into the liquid crystal material. As the writing beam is scanned across the cell, the dye absorbs the laser radiation and converts it to heat. The dye has little or no effect on light of a visible wavelength. Thus, the image written on such a device can be projected simply by passing projection light through the device in a manner similar to that used in an ordinary slide projector. The necessary projection system is therefore simpler and less expensive than in the case of reflective devices. However, the infrared absorption dye used in such device can be bleached after repetitive uses, and thus is inadequate for many applications.

What is needed, therefore, is a laser-addressed liquid crystal light modulator which overcomes the disadvantages of both the transmissive and reflective devices described above. Specifically, such a device should be able to use the relatively simple optical system of the transmissive device. However, the device should provide a long useful life without exhibiting reductions in performance.

SUMMARY OF THE INVENTION

In meeting the foregoing needs, the present invention provides a laser-addressable liquid crystal cell. The cell includes first and second transparent substrate layers for defining the outer surfaces for the cell. First and second electrode layers are each formed from a transparent electrically conductive material. The first electrode layer is disposed adjacent the first substrate layer, and the second electrode layer is disposed adjacent the second substrate layer. A smectic liquid crystal layer is located between the electrode layers. Between the liquid crystal layer and the second electrode layer is disposed means for absorbing infrared radiation while permitting visible radiation to pass therethrough.

The infrared absorbing means is a three-part structure. This structure includes a layer of radiation absorbing material, a layer selectively reflective to infrared radiation and transparent to visible radiation, and a spacer layer of dielectric material disposed therebetween.

The liquid crystal cell may be laser addressed through the first substrate layer. Alternatively, the cell may be laser addressed through the second substrate layer.

The layer of radiation absorbing material may be formed from a metallic material Preferably, the layer of radiation absorbing material is formed from nickel. The spacer layer may be silicon dioxide.

The selectively reflective layer comprises a plurality of alternating layers of first and second dielectric materials, the first material having a relatively high index of refraction with respect to the second material. The total number of the alternating layers is an odd number, with each of the alternating layers having an optical thickness of one-quarter of the wavelength of the infrared radiation. Preferably, the first material is titanium dioxide and the second material is silicon dioxide.

Accordingly, it is an object of the present invention to provide a laser-addressable liquid crystal cell suitable for projecting the written image with visible light; to provide such a liquid crystal cell which can be addressed using an infrared laser diode; to provide such a liquid crystal cell that can be operated for image projection using a relatively simple optical system; to provide such a liquid crystal cell that can be operated for image projection in a transmissive mode; and to provide such a liquid crystal cell that has a long useful life.

Other objects and advantages of the invention will be apparent from the following description, the accompanying drawings and the appended claims.

BRIEF DESCRIPTION OF THE DRAWINGS

FIG. 1 is a sectional view of a portion of a liquid crystal cell in accordance with the present invention;

FIG. 2 is a sectional view of a portion of a liquid crystal cell showing an alternate embodiment of the present invention; and FIG. 3 is a sectional view of a portion of a liquid crystal cell showing a further alternate embodiment of the present invention.

DETAILED DESCRIPTION OF THE PREFERRED EMBODIMENTS

The present invention provides a liquid crystal light modulator cell which is addressed by an infrared laser beam for the recording of data on the cell. Subsequent to recording, visible light is passed through the cell in a transmissive mode to project the image onto an appropriate display or photosensitive media.

The infrared laser used to address the cell is preferably a diode laser producing a beam having a wavelength of 830 nm. The beam is scanned across the entire cell by an appropriate scanning means to write the image data onto the cell. The specific means by which the cell is addressed by the laser, and the specific means by which projection light is directed through the cell, are unimportant to the invention described herein. However, one example of such means can be seen by reference to U.S. Pat. No. 4,564,853.

Referring now to FIG. 1, a cross-sectional view of a liquid crystal light modulator cell constucted in accordance with the present invention is shown. The cell 10 contains a liquid crystal layer 12. Any suitable liquid crystal material of the smectic-A class may be used, with one preferred example being CBOA.

Cell 10 is supported by a pair of transparent substrate layers 14 and 16. Such layers are preferably formed from glass. Located between substrate layer 14 and liquid crystal material 12 is located layer of a transparent electrically conductive material 18. A second layer of such material 20 is provided adjacent substrate layer 16. These transparent conductive layers are preferably formed from indium-tin oxide. Layers 18 and 20 together act as the conductor for use in erasing the liquid crystal cell. Accordingly, an electric field can be generated between layers 18 and 20 to realign the liquid crystal into a totally non-scattering state.

Infrared laser radiation from an appropriate source (not shown), such as a laser diode, is directed onto the cell from the direction indicated generally in FIG. 1 by arrow 22. Projection light may be directed onto the cell from either direction.

Located between the liquid crystal material 12 and conductor layer 20 is a visibly transparent infrared absorber 24. Such absorber provides strong absorption at laser diode wavelength, and when constructed in accordance with the preferred embodiment, can achieve absorption at 830 nm of over 90%. The absorber also provides high transmission in the visible spectrum. When constructed in accordance with the preferred embodiment, the cell can achieve transmissions over the visible range of approximately 40-50%.

As the laser radiation is absorbed, heat is generated in the absorber 24. This heat then acts upon the liquid crystal material within layer 12 to create the scattering regions corresponding to the image information to be recorded.

The transparent infrared absorber consists of a three-layer stack of dielectric and metal thin films. As shown in FIG. 1, the absorber includes a dielectric laser mirror 26, an absorbing layer 28, and a spacer layer 30 located therebetween. These three layers together form an interference cavity which, when properly tuned, can be made highly absorptive to the incident laser light.

In the three layer infrared absorber 24, the absorbing layer 28 cooperates with the spacer 30 to receive the incoming infrared radiation. At the interface between absorbing layer 28 and the liquid crystal material 12, some light may be reflected. The remaining light passes through the absorbing layer 28 and into the spacer layer 30. This light is then reflected at the laser mirror 26, whereafter it returns to the absorbing layer/liquid crystal interface and interferes with the light reflected by this interface. The net amount of reflected light can be minimized by tuning the optical thickness of the spacer layer 30. In this way, more than 90% of the incident infrared radiation can be absorbed.

The absorbing layer is preferably formed from a very thin metal layer. Thinness of this layer is required so that its single-pass optical transmission is high. This is necessary where a projection beam is being passed through the cell. Preferred thickness for this layer is in the range of 5-10 nm, most preferably 7.5 nm. In one preferred embodiment, the absorbing layer is formed from nickel, but a number of other suitable materials may be used, including chromium or manganese.

Spacer layer 30 is a transparent dielectric layer. As noted, thickness of this layer is selected to minimize the reflection or maximize the absorption of the infrared laser radiation. Preferred thickness for this layer is in the range of 180 to 220 nm, most preferably 200 nm. In one preferred embodiment, this layer may be formed from silicon dioxide, and magnesium fluoride may also be used.

Further details regarding a three-layer absorptive structure can be found by reference to Bell and Spong, "Anti-Reflection Structures for Optical Recording," *I.E.E.E. Journal of Quantum Electronics* QE-14(7), 487-495 (July 1978). In the device described therein, the reflective layer is an opaque, typically metallic layer which provides complete reflection of the infrared radiation at the spacer layer/reflecting layer interface. Of course, such an approach is not usable in a transmissive liquid crystal light modulator, since such a layer will prevent passage of the visible light required for projecting the completed image.

In the present invention, laser mirror 26 is formed as a multi-layer structure having a stack of dielectric layers. Such a mirror provides a high reflectivity to the infrared radiation, in the order of 95-99%, but is essentially transparent to visible light. The layers of the mirror are formed from two different materials, and are stacked in alternating fashion. In a preferred embodiment, the odd numbered layers of the stack are formed from a material having a high index of refraction. In one example, an appropriate material for these layers is $XO_2$, where X is selected from the group including Ti, Hf or Zr, with Ti being preferred. Even numbered layers are each formed from a material having a relatively low index of refraction. One preferred example of such material is silicon dioxide, $SiO_2$, and magnesium fluroide, $MgF_2$, may also be used. Each layer of the stack is formed to have an optical thickness equal to a quarter-wavelength of the laser light. In this way, the laser mirror is specifically tuned to the incoming radiation.

Preferably, the total number of dielectric layers within the laser mirror is at least seven. In one example, eleven layers are used, with the resulting mirror demonstrating approximately 99% reflection at 830 nm and greater than 95% average transmission over the visible spectrum.

Methods for fabricating such a laser mirror are known in the art. Further details regarding the theory of such devices can be found by reference to Baumeister, "Interference, and Optical Interference Coatings", *Applied Optics and Optical Engineering*, pp. 285–323 (Kingslake ed., 1965).

A variation on the embodiment of the cell shown in FIG. 1 can be seen by reference to FIG. 2. In addition, the cell in FIG. 2 is shown in greater detail in that the individual layers of laser mirror 26 can be seen. In this embodiment, an additional insulation layer 32 is disposed between the liquid crystal cell 12 and the absorbing layer 28. This insulating layer 32 includes two portions, one layer 34 formed from a silicon monoxide material for aligning the liquid crystal molecules, and a second portion 36 formed from a silicon dioxide material. Layer 32 is provided for DC current blocking, and is selected to have a thickness so that it will not significantly affect the optical property of the absorptive structure. In a preferred embodiment, this layer may be of a thickness of 115 nm.

A further alternative embodiment is shown in FIG. 3. In the cell 40 shown therein, a transparent electrode layer 42 is located beneath an upper glass substrate layer 44. The infrared absorber 46 is positioned adjacent the electrode 42, and again includes an absorbing layer 48, a spacer layer 50, and laser mirror 52. The liquid crystal material 54 is positioned beneath the laser mirror 52, and is followed by the second electrode layer 56 and the lower substrate 58. The infrared laser writing beam is directed onto the cell from the direction indicated by arrow 60. The visible projection light can be directed onto the cell from either direction. In this embodiment, sufficient heat is generated by the absorption of the infrared radiation in both the electrode layer 42 and the absorbing layer 48 to create the scattering regions within the liquid crystal material 54.

Preferably, cell 40 is formed from layers of the same materials and similar thicknesses as corresponding layers in the cell 10 of FIG. 1.

While the form of apparatus herein described constitutes a preferred embodiment of this invention, it is to be understood that the invention is not limited to this precise form of apparatus, and that changes may be made therein without departing from the scope of the invention which is defined in the appended claims

What is claimed is:

1. A laser-addressable liquid crystal cell, comprising:
   first and second transparent substrate layers for defining the outer surfaces for said cell;
   first and second electrode layers, each formed from a transparent electrically conductive material, said first electrode layer disposed adjacent said first substrate layer, and said second electrode layer disposed adjacent said second substrate layer;
   a smectic liquid crystal layer disposed between said electrode layers; and
   means disposed between said liquid crystal layer and said second electrode layer for absorbing infrared radiation while permitting visible radiation to pass therethrough;
   said infrared absorbing means including a layer of radiation absorbing material, a layer selectively reflective to infrared radiation and transparent to visible radiation, and a spacer layer of dielectric material disposed therebetween.

2. The liquid crystal cell as defined in claim 1, wherein said cell is laser addressed through said first substrate layer.

3. The liquid crystal cell as defined in claim 1, wherein said cell is laser addressed through said second substrate layer.

4. The liquid crystal cell as defined in claim 1, wherein said layer of radiation absorbing material is formed from a metallic material.

5. The liquid crystal cell as defined in claim 4, wherein said layer of radiation absorbing material is formed from nickel.

6. The liquid crystal cell as defined in claim 1, wherein said spacer layer is formed from a silicon dioxide material.

7. The liquid crystal cell as defined in claim 1, wherein said spacer layer is formed from a magnesium fluoride material.

8. The liquid crystal cell as defined in claim 1, wherein said selectively reflective layer is a dielectric mirror.

9. The liquid crystal cell as defined in claim 1, wherein said selectively reflective layer comprises a plurality of alternating layers of first and second dielectric materials, said first material having a relatively high index of refraction with respect to said second material.

10. The liquid crystal cell as defined in claim 9, wherein each of said alternating layers is of an optical thickness of one-fourth of the wavelength of said infrared radiation.

11. The liquid crystal cell as defined in claim 9, wherein said first material is $XO_2$, wherein X is selected from the group including Ti, Hf and Zr.

12. The liquid crystal cell as defined in claim 9, wherein said second material is silicone dioxide.

13. The liquid crystal cell as defined in claim 9, wherein said second material is magnesium fluoride.

14. The liquid crystal cell as defined in claim 1, wherein said first and second electrode layers are formed from an indium-tin oxide material.

15. A laser-addressable liquid crystal cell, comprising:
   a layer of a smectic liquid crystal material;
   means disposed adjacent said liquid crystal layer for absorbing infrared radiation while permitting visible radiation to pass therethrough;
   said infrared absorbing means including a layer of radiation absorbing material, a layer selectively reflective to infrared radiation and transparent to visible radiation, and a spacer layer of dielectric material disposed therebetween; and
   first and second electrode layers, each formed from a transparent electrically conductive material, said electrode layers having said liquid crystal layer and said infrared absorbing means disposed therebetween.

16. The liquid crystal cell as defined in claim 15, further comprising a first transparent substrate layer located adjacent said first electrode layer, and a second transparent substrate layer located adjacent said second electrode layer, for defining the outer surfaces for said cell.

17. The liquid crystal cell as defined in claim 15, wherein said cell is laser addressed through said first electrode layer.

18. The liquid crystal cell as defined in claim 15, wherein said cell is laser addressed through said second electrode layer.

19. The liquid crystal cell as defined in claim 15, wherein said layer of radiation absorbing material is formed from a metallic material.

20. The liquid crystal cell as defined in claim 19, wherein said layer of radiation absorbing material is formed from nickel.

21. The liquid crystal cell as defined in claim 15, wherein said selectively reflective layer comprises a plurality of alternating layers of first and second materials, said first material having a relatively high index of refraction with respect to said second material.

22. The liquid crystal cell as defined in claim 21, wherein each of said alternating layers is of an optical thickness of one-quarter of the wavelength of said infrared radiation.

23. The liquid crystal cell as defined in claim 21, wherein said first material is $XO_2$, wherein X is selected from the group including Ti, Hf and Zr.

24. The liquid crystal cell as defined in claim 21, wherein said second material is silicone dioxide.

25. The liquid crystal cell as defined in claim 21, wherein said second material is magnesium fluoride.

26. The liquid crystal cell as defined in claim 15, wherein said first and second electrode layers are formed from an indium-tin oxide material.

* * * * *